US011909720B2

(12) United States Patent
Szczepanik et al.

(10) Patent No.: US 11,909,720 B2
(45) Date of Patent: Feb. 20, 2024

(54) SECURE REMOTE SUPPORT OF SYSTEMS DEPLOYED IN A PRIVATE NETWORK

(71) Applicant: KYNDRYL, INC., New York, NY (US)

(72) Inventors: Grzegorz Piotr Szczepanik, Cracow (PL); Tiberiu Suto, Franklin, NY (US); Nadiya Kochura, Bolton, MA (US); Nicolo' Sgobba, Bratislava (SK); Erik Rueger, Ockenheim (DE)

(73) Assignee: KYNDRYL, INC., New York, NY (US)

( * ) Notice: Subject to any disclaimer, the term of this patent is extended or adjusted under 35 U.S.C. 154(b) by 216 days.

(21) Appl. No.: 17/478,165

(22) Filed: Sep. 17, 2021

(65) Prior Publication Data
US 2023/0088489 A1 Mar. 23, 2023

(51) Int. Cl.
H04L 9/40 (2022.01)

(52) U.S. Cl.
CPC .......... H04L 63/0209 (2013.01); H04L 63/10 (2013.01)

(58) Field of Classification Search
CPC .............................. H04L 63/0209; H04L 63/10
See application file for complete search history.

(56) References Cited

U.S. PATENT DOCUMENTS

| 5,544,320 | A | 8/1996 | Konrad |
| 6,148,323 | A | 7/2000 | Whitner et al. |
| 6,449,651 | B1 | 9/2002 | Dorfman et al. |
| 8,843,998 | B2 | 9/2014 | Fu et al. |
| 9,258,262 | B2 | 2/2016 | Watt et al. |
| 10,936,400 | B2 | 3/2021 | Schmitt et al. |
| 2012/0331528 | A1* | 12/2012 | Fu .......................... H04L 67/10 726/4 |
| 2014/0359704 | A1 | 12/2014 | Chen |
| 2020/0067878 | A1* | 2/2020 | Pednekar ................ G06F 21/31 |
| 2020/0092355 | A1* | 3/2020 | Pogrebinsky .......... H04L 41/12 |
| 2020/0174878 | A1* | 6/2020 | Schmitt ............... G06F 11/0781 |

(Continued)

FOREIGN PATENT DOCUMENTS

| CN | 1598770 | 3/2005 |
| CN | 102098559 | 6/2011 |
| CN | 103945330 | 7/2014 |

(Continued)

OTHER PUBLICATIONS

Mell et al., "The NIST Definition of Cloud Computing", NIST, Special Publication 800-145, Sep. 2011, 7 pages.

(Continued)

Primary Examiner — Chau Le
(74) Attorney, Agent, or Firm — Dan Housley; Andrew M. Calderon; Calderon Safran & Cole P.C.

(57) ABSTRACT

A computer-implemented method includes: connecting, by a computing device, to a database using an outbound connection, wherein the computing device is an information technology (IT) product in a private network and the database is outside the private network; receiving, by the computing device, a response from the database, the response including a command; executing, by the computing device, the command; and sending, by the computing device, result data to the database, wherein the result data is data that results from executing the command on the computing device.

20 Claims, 6 Drawing Sheets

(56) References Cited

U.S. PATENT DOCUMENTS

2021/0297417 A1* 9/2021 Pogrebinsky ......... H04L 63/107

FOREIGN PATENT DOCUMENTS

| CN | 104714817 | 6/2015 |
|----|-----------|--------|
| CN | 106325909 | 1/2017 |
| CN | 106487935 | 3/2017 |
| CN | 111580833 | 8/2020 |
| EP | 1177480   | 2/2002 |
| JP | 3918827   | 5/2007 |

OTHER PUBLICATIONS

Anonymous, "Call Home in IAS", https://www.ibm.com/docs/en/ias?topic=feature-call-home-in-ias, accessed Aug. 17, 2021, 3 pages.

Anonymous, "Customer-hosted Private Cloud RemoteAccess Options", https://auth0.com/docs/private-cloud/private-cloud-onboarding/private-cloud-remote-access-options, accessed Sep. 17, 2021, 6 pages.

Anonymous, "Cloud Remote Access Server", https://www.gladinet.com/file-server-cloud-remote-access/, accessed Sep. 17, 2021, 20 pages.

Anonymous, "Secure Remote Access to On-Premises Private Cloud Resources with Microsoft Windows DirectAccess", https://www.ironnetworks.com/blog/secure-remote-access-premises-private-cloud-resources-microsoft-windows-directaccess#.X1gpgFB7kcg, Sep. 4, 2013, 1 page.

Anonymous, "IBM Tivoli Remote Control User's Guide Version 3.8", http://publib.boulder.ibm.com/tividd/td/remote/ SC23-4842-00/en_US/PDF/RCUmst.pdf, accessed Sep. 17, 2021, 178 pages.

* cited by examiner

SECURE REMOTE SUPPORT OF SYSTEMS DEPLOYED IN A PRIVATE NETWORK

BACKGROUND

Aspects of the present invention relate generally to information technology support and security and, more particularly, to secure remote support of systems deployed in a private network.

In recent years, virtual privately-owned cloud is a model that has been widely accepted and adopted by a vast number of enterprises. It allows companies to enjoy the benefit of cloud computing while avoiding some potential safety hazards of having the systems and data accessible from outside the enterprise firewall. By having the virtual privately-owned cloud deployed behind an enterprise firewall, the information technology (IT) administrators can effectively control the cloud resources, meeting the demand of enterprise to keep cloud computing fail safe.

SUMMARY

In a first aspect of the invention, there is a computer-implemented method including: connecting, by a computing device, to a database using an outbound connection, wherein the computing device is an information technology (IT) product in a private network and the database is outside the private network; receiving, by the computing device, a response from the database, the response including a command; executing, by the computing device, the command; and sending, by the computing device, result data to the database, wherein the result data is data that results from executing the command on the computing device.

In another aspect of the invention, there is a computer program product including one or more computer readable storage media having program instructions collectively stored on the one or more computer readable storage media. The program instructions are executable to cause a computing device to: connect to a database using an outbound connection, wherein the computing device is an information technology (IT) product in a private network and the database is outside the private network; receive a response from the database, the response including a command; execute the command; and send result data to the database, wherein the result data is data that results from executing the command on the computing device, the private network includes a firewall that blocks inbound connections from devices outside the private network, the response from the database is a response to the outbound connection, and the connecting includes the computing device transmitting its unique identifier to the database.

In another aspect of the invention, there is system including a processor, a computer readable memory, one or more computer readable storage media, and program instructions collectively stored on the one or more computer readable storage media. The program instructions are executable to cause a support provider computing device to: store plural commands in a database, each respective one of the commands being associated with a respective unique identifier; receive an outbound connection from a computing device that is behind a firewall in a private network, the outbound connection including an identifier of the computing device; identify one of the commands stored in the database by matching the identifier of the computing device to one of the unique identifiers stored in the database; respond to the outbound connection from the computing device with a response communication that includes the identified one of the commands; receive result data from the computing device as a result of the computing device running the identified one of the commands; and store the result data with the identifier of the computing device in the database.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
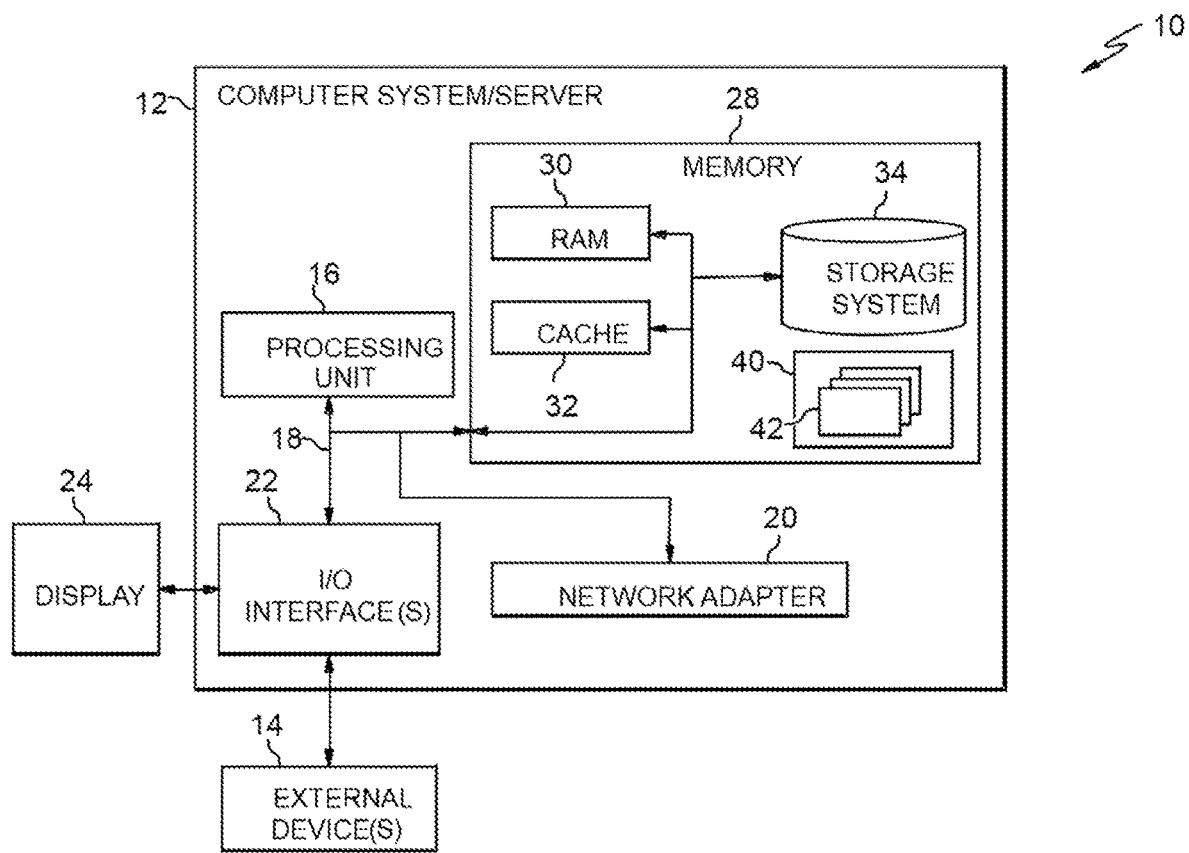
FIG. 1 depicts a cloud computing node according to an embodiment of the present invention.

Aspects of the present invention relate generally to information technology support and security and, more particularly, to secure remote support of systems deployed in a private network. Many IT products provide some kind of system remote control for the IT support provider which enables debugging efforts for product problems (e.g., in the immediate or short term), as well as general analysis to improve the product via data mining (e.g., in the long term). This process is commonly referred to as remote access. Typical remote access utilizes an inbound connection from the IT support provider to the customer's network infrastructure. Inbound connection in this sense means that the communication is initiated from the IT support provider into the customer's network for the purpose of the IT support provider remotely controlling one or more devices inside the customer's network. However, such inbound connections may not be allowed by some customers due to security concerns. As such, due to various constraints, it is not always possible to enable an inbound connection for the IT support provider. Although such constraints might enhance the security of the customer's network, this can result in preventing the IT support provider from quickly and remotely assisting a user inside the customer's network.

Aspects of the invention address this issue by providing asynchronous secure management of systems on a private cloud. Embodiments enable remote support to the IT products inside the private cloud without violating existing customer security rules; namely, no inbound connection for remote access is used. Implementations provide a method that allows remote support to initiate remote system commands by utilizing special methods built upon outbound connections such as call home functionality, for example.

Embodiments include placing system commands to be executed into a database within the vendor support network, where an IT product, which is deployed in the customer data center in a private cloud, connects to during a call home process. In one example, the IT product reads the content of the database and with that the commands to be executed as requested by the remote support engineer, after an optional authorization process, the requested commands can be executed on the related remote supported system. In this example, as a final step, the IT product offloads the command results, complementary to the standard outbound connection into the datastore of the IT vendor, prior to terminating the remote support session. The additional layer of security added by providing the customer with the required controls over executing defined commands by transparently notifying the customer through a message at the workstation allows for required confidence with remotely defined and initiated command execution.

According to an aspect of the invention, there is a method for providing remote information technology (IT) support of an IT product without an inbound connection to the IT product, the comprising: establishing a data store of IT support commands for IT products and making the data store accessible to outbound connections of the IT products (e.g., via a "call home" functionality where an IT product checks the data store at a particular interval); in response to determining to provide remote IT support for an IT product, identifying, in the data store, the IT support commands needed for the remote IT support, and permitting the IT product to retrieve the identified IT support commands from the data store using an outbound connection of the IT product; and receiving results/outputs of the IT support commands from the IT product. In this manner, implementations of the invention are used to provide remote support for IT products inside a private network, without using inbound connections and conventional remote access.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
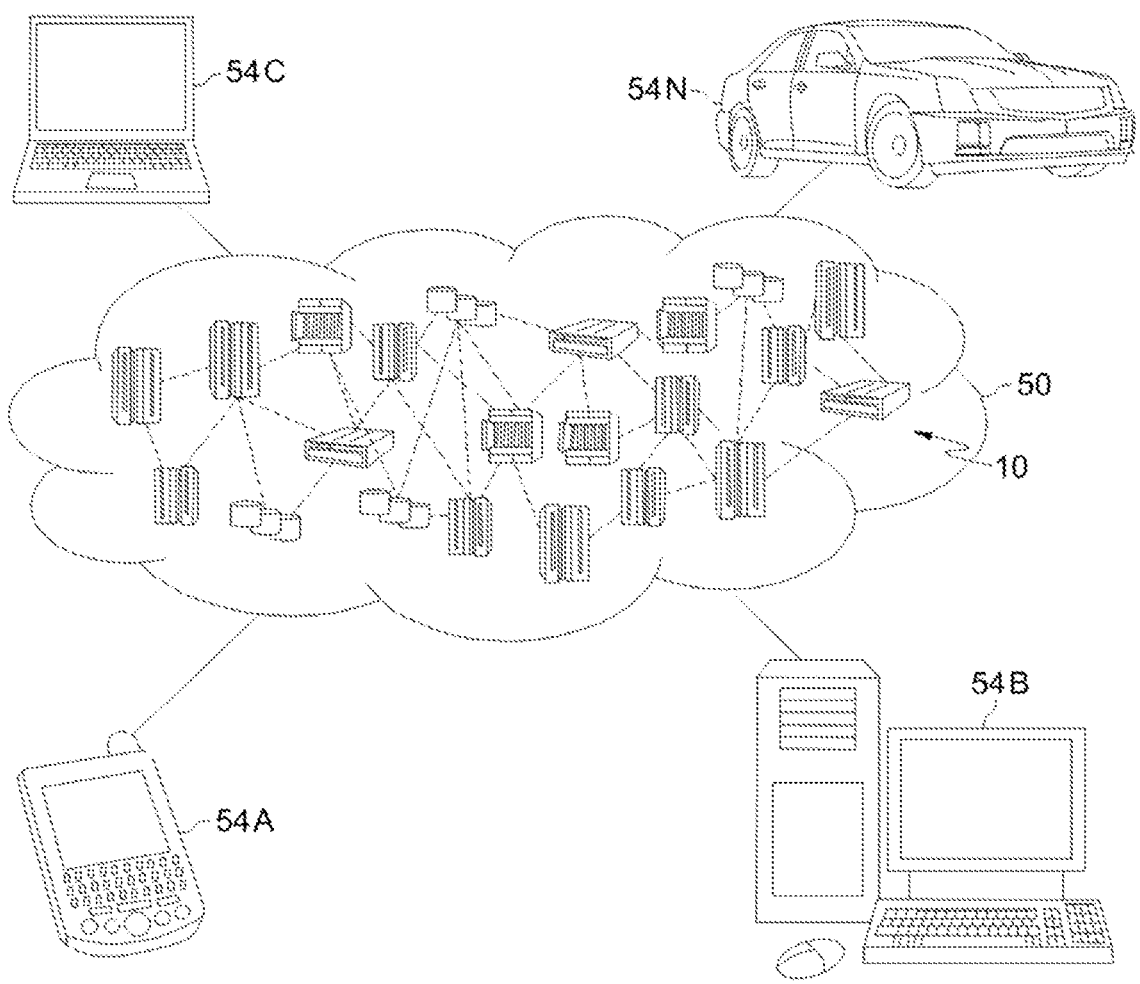
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
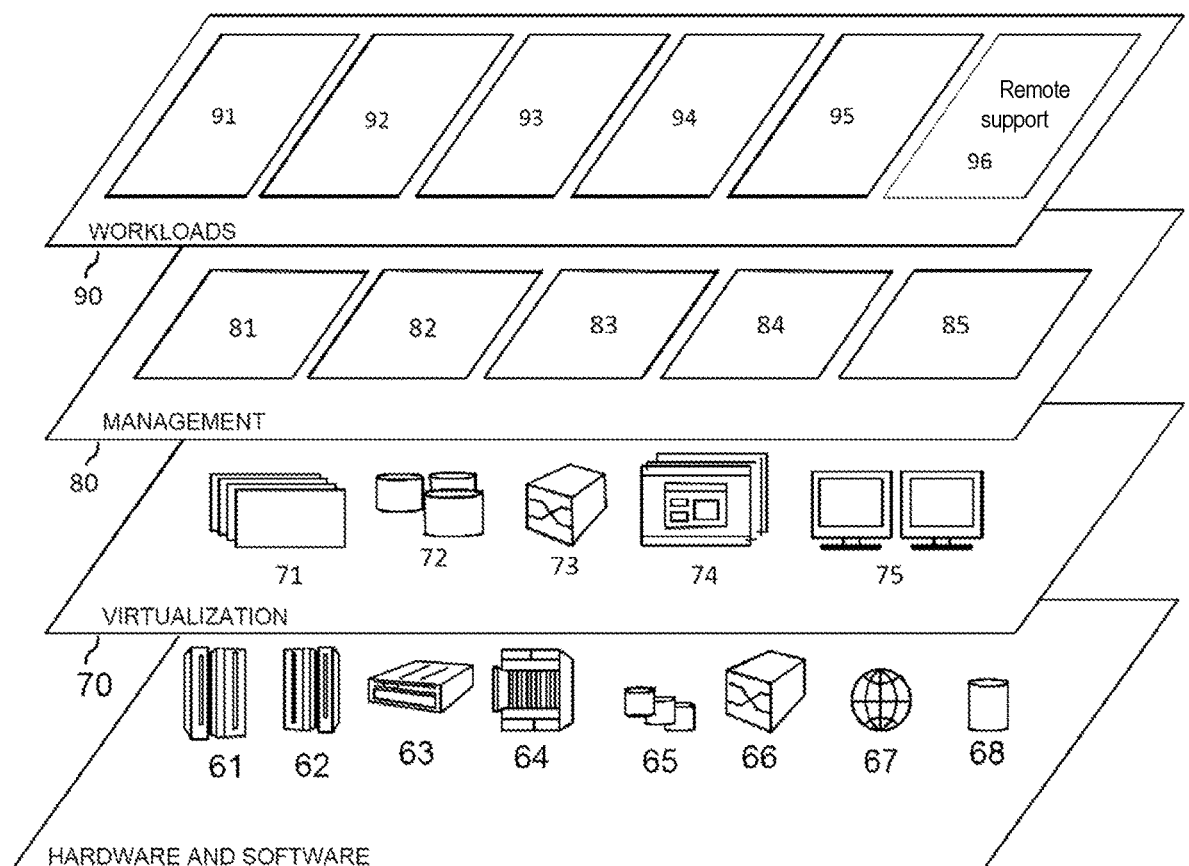
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and remote support 96.

Implementations of the invention may include a computer system/server 12 of FIG. 1 in which one or more of the program modules 42 are configured to perform (or cause the computer system/server 12 to perform) one of more functions of the remote support 96 of FIG. 3. For example, the one or more of the program modules 42 may be configured to: connect to a database using an outbound connection, wherein the computing device is an information technology (IT) product in a private network and the database is outside the private network; receive a response from the database, the response including a command; execute the command; and send result data to the database, wherein the result data is data that results from executing the command on the computing device, the private network includes a firewall that blocks inbound connections from devices outside the private network, the response from the database is a response to the outbound connection, and the connecting includes the computing device transmitting its unique identifier to the database.

Figure 4:
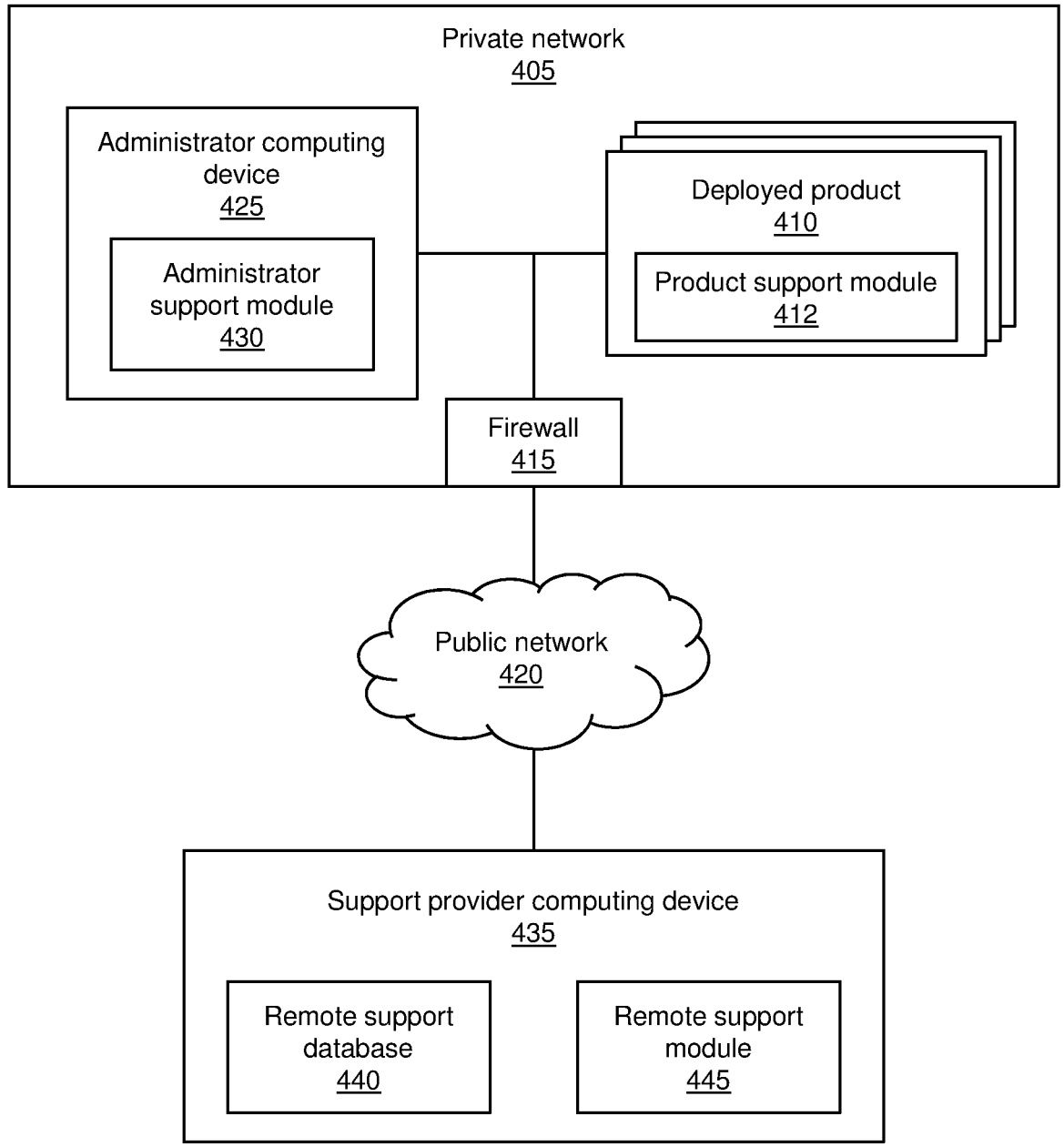
FIG. 4 shows a block diagram of an exemplary environment in accordance with aspects of the invention.

FIG. 4 shows a block diagram of an exemplary environment in accordance with aspects of the invention. In embodiments, the environment includes a private network 405 including one or more deployed products 410 (referred to herein as products 410) behind a firewall 415. In one example, the private network 405 is a virtual privately-owned cloud and the products 410 are IT products used in the virtual privately-owned cloud. The products 410 may be hardware devices including but not limited to servers, desktop computers, laptop computers, tablet computers, smartphones, data storage devices, copiers, printers, routers, switches, etc. The products 410 may operate using firmware and/or software, for example.

In embodiments, each product 410 comprises a product support module 412, which may comprise one or more program modules such as program module 42 described with respect to FIG. 1. The product support module 412 is configured to communicate with other devices in the environment to provide IT support for the product 410 in accordance with aspects of the invention and as described in greater detail herein.

As shown in FIG. 4, a firewall 415 or other network traffic filtering device is between the private network 405 and a public network 420, such as the Internet. The firewall 415 may be a hardware firewall or a software firewall. In embodiments, the firewall 415 is configured to block certain inbound connections, where an inbound connection is a network communication that originates outside the private network 405 and is directed toward a product 410 inside the private network 405.

In a particular example of a high security private network 405, the firewall 415 is configured to block all inbound connections. In this particular example, the firewall 415 permits outbound connections, i.e., network communications that originate inside the private network 405 and are directed toward an endpoint outside the private network 405. In this particular example, the firewall 415 is configured to permit responses to outbound connections, such a response being a network communication that is (i) from an endpoint outside the private network 405 and (ii) in response to a network communication that originated inside the private network 405. In this particular example, the firewall 415 would block a remote access request from an IT support provider that is outside the private network 405. This is because the remote access request from an IT support provider is an inbound connection due to the fact that it originates from outside the private network 405. As a result, the IT support provider cannot initiate a remote access session with any of the products 410 in the private network 405 and, thus, cannot provide IT support to the products 410 using this conventional technique.

In embodiments, the private network 405 includes one or more private computer networks (such as a private LAN behind the firewall 415) and the devices inside the private network 405 (i.e., the products 410 and an administrator computing device 425) communicate with each other using the one or more private computer networks.

In embodiments, the private network 405 includes at least one administrator computing device 425, which may be a server, desktop computer, laptop computer, tablet computer, or smartphone, and that may comprise one or more elements of the computer system/server 12 of FIG. 1. In embodiments, the administrator computing device 425 comprises an administrator support module 430, which may comprise one or more program modules such as program module 42 described with respect to FIG. 1. The administrator support module 430 is configured to perform tasks in the environment to facilitate IT support for the products 410 in accordance with aspects of the invention and as described in greater detail herein.

With continued reference to FIG. 4, the environment includes a support provider computing device 435 that is outside (e.g., external to) the private network 405 and that is configured to provide IT support to the products 410 inside the private network 405 in accordance with aspects of the invention. The support provider computing device 435 is a computing device such as a server or workstation and comprises one or more elements of the computer system/server 12 of FIG. 1. In a cloud implementation, the support provider computing device 435 represents one or more cloud computing nodes in a cloud computing environment (such as cloud computing nodes 10 and cloud computing environment 50 of FIG. 2).

In embodiments, the support provider computing device 435 comprises or has access to a remote support database 440 that stores information that is used in providing IT support to products 410 in the private network 405 in accordance with aspects of the invention. In one example, the information stored in the remote support database 440 includes a unique identifier of each product 410 in the private network 405, command definitions, and requester designations, each of which is described in greater detail herein.

In embodiments, the support provider computing device 435 comprises a remote support module 445, which may comprise one or more program modules such as program modules 42 described with respect to FIG. 1. The remote support module 445 is configured to perform tasks in the environment to provide IT support for the products 410 in accordance with aspects of the invention. In embodiments, the remote support module 445 is configured to perform one or more processes described herein including but not limited to: insert, revise, or delete information stored in the remote support database 440.

In embodiments, the product support module 412 of one of the products 410 is configured to perform one or more processes described herein including but not limited to: connect to the remote support database 440 using an outbound connection; identify and retrieve a command stored in the remote support database 440 for this product 410; optionally send a request to the administrator computing device 425 to execute the command; execute the command on the product 410; and offload results of executing the command to the remote support database 440.

In embodiments, the administrator support module 430 of the administrator computing device 425 is configured to perform one or more processes described herein including but not limited to: receive a request from one of the products 410 to execute a command that has been retrieved from the remote support database 440; and approve or deny the request.

The products 410, the administrator computing device 425, and the support provider computing device 435 each may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

With continued reference to FIG. 4, in embodiments each of the products 410 is registered with the remote support database 440. As part of the registration, the remote support database 440 may store a respective unique identifier for each of the products 410. The unique identifier may be a system serial number (e.g., for a hardware product) or a product ID (e.g., for a software product).

In accordance with aspects of the invention, the remote support database 440 stores commands that are used by the products 410 for providing remote support to the products 410. Examples of types of commands that may be stored in the remote support database 440 include commands that cause one of the products 410 to: cleanup system log files; change system log level; change system parameters such as network settings/performance or process priority settings; upgrade system code; capture system logs and upload to support server; and run individual scripts. The commands stored in the remote support database 440 may be in the form of plaintext scripts, application macros, binary files that execute certain commands, and SQL queries, for example.

In embodiments, a support provider (e.g., a support engineer) stores the commands in the remote support database 440 using the support provider computing device 435. In one example, the support provider receives an email from a user of one of the products 410, the email describing a problem with the one of the products 410. In response to this email, the support provider uses the support provider computing device 435 to define a command to address the problem and saves the command in the remote support database 440. In embodiments, the support provider also stores information describing the commands in the remote support database 440. The information may include script filenames or other descriptors based on the unique identifiers of the various products 410. In this manner, a command stored in the remote support database 440 may be associated with a particular one of the products 410 by including the unique identifier of the particular product 410 in the information stored with the command. In this manner, the support provider computing device 435 may store different commands for different ones of the products 410 in the remote support database 440.

Still referring to FIG. 4, in embodiments a particular one of the products 410 connects to the remote support database 440 for the purpose of retrieving commands that are stored in the remote support database 440 for this particular product 410. According to aspects of the invention, the product 410 uses an outbound connection to connect to the remote support database 440. In one example, the outbound connection is a call home process. In embodiments, this connection is made using communication from the product 410 to the remote support database 440 using an encrypted protocol such as Secure Shell (SSH) or Hypertext Transfer Protocol Secure (HTTPS), for example. Other possible embodiments may use an encrypted Secure Sockets Layer (SSL) tunnel to protect other types of information exchange such as SQL queries between the customer and support provider systems. An advantage of the SSH protocol is that it allows certificate-based passwordless secure authentication and verification of both hosts preventing data interception or spoofing of information in either direction. With a proper SSH certificate configuration, the customer system can conclusively validate it is communicating with the correct provider server and vice versa.

In one example, the communication of the outbound connection from the product 410 to the remote support database 440 includes the unique identifier of the particular product 410. In this manner, the remote support module 445 of the support provider computing device 435 may identify all commands stored in the remote support database 440 for this product 410 by finding the commands that include the same unique identifier as that included in the communication of this outbound connection. The communication of the outbound connection may also include an identifier of the private network 405, which is useful for tracking customer support usage when the remote support database 440 is configured to provide remote support to plural different private networks, e.g., for different customers. The communication of the outbound connection may also include a support contract identifier that the support provider can relate to a pre-established support contract between the customer and the support provider.

In some embodiments, a particular one of the products 410 connects to the remote support database 440 to obtain the stored commands on a regular basis. The regular basis may be a predefined amount of time, such as every 15 minutes for one example. In other embodiments, the particular one of the products 410 connects to the remote support database 440 to obtain the stored commands only as a result of a problem trigger. In other embodiments, the particular one of the products 410 connects to the remote support database 440 to obtain the stored commands both on a regular basis and as a result of a problem trigger. For example, a product 410 may initially make the outbound connection as a result of a problem trigger, and then repeat the outbound connection every 15 minutes until the problem is resolved.

In accordance with aspects of the invention, the support provider computing device 435 responds to the outbound connection from the product 410 to the remote support database 440. This response communication from the support provider computing device 435 to the product 410 is not a new inbound connection; instead, this response communication from the support provider computing device 435 to the product 410 is in response to the already initiated outbound connection. In embodiments, this response communication from the support provider computing device 435 to the product 410 includes a command that is stored in the remote support database 440 for this particular product 410, e.g., determined using the unique identifier of the product 410 as described herein. In embodiments, this response communication from the support provider computing device 435 to the product 410 uses the same protocol as the initial communication from the product 410 to the remote support database 440, e.g., SSH.

With continued reference to FIG. 4, in embodiments the product support module 412 of a product 410 requests approval from the administrator support module 430 to execute the command that the product support module 412 retrieved from the remote support database 440. In embodiments, the administrator support module 430 stores or has access to a list of pre-approved commands. In this example, when the product support module 412 requests approval for a command that is included in the list of pre-approved commands, the administrator support module 430 automatically approves the command without any user action. In this example, when the product support module 412 requests approval for a command that is not included in the list of pre-approved commands, the administrator support module 430 prompts a user of the administrator computing device 425 to provide input to approve or deny the request. The administrator support module 430 thus approves or denies the request from the product support module 412 to execute the command that was retrieved from the remote support database 440. In either event (approval or denial), the administrator support module 430 sends a response to the product support module 412 that requested approval, the response indicating either approval or denial to execute the command.

In embodiments, in response to receiving approval from the administrator computing device 425 to execute the command, the product support module 412 executes the command on the product 410. As described herein, the command may be a command that when executed by the product 410 causes the product 410 to: cleanup system log files; change system log level; change system parameters such as network settings/performance or process priority settings; upgrade system code; capture system logs and upload to support server; and run individual scripts. These are examples and other commands may be used. In embodiments, the product 410 sends result data to the support provider computing device 435 in response to executing the command. The result data may include, for example, error codes, status codes, memory, CPU, or other diagnostic data, settings and configuration data, system or application logs, etc. In embodiments, the product 410 includes its product ID with the result data so that the results data is associated with this product. In embodiments, the support provider computing device 435 stores the results data in the remote support database 440, e.g., in a log that identifies the product 410, the command, and the results of executing the command on the product.

Figure 5:
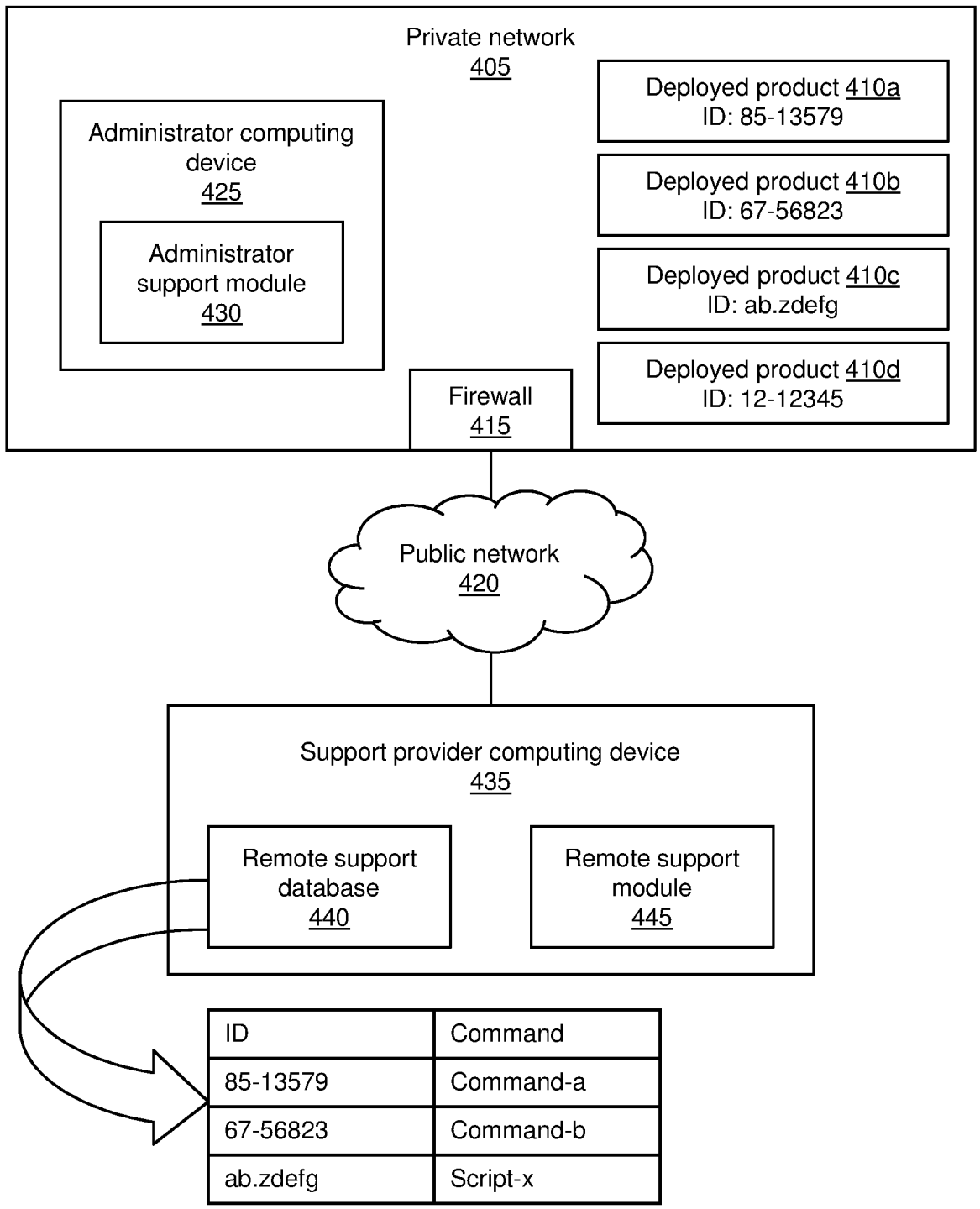
FIG. 5 shows an exemplary use case in accordance with aspects of the invention.

FIG. 5 shows an example use case in accordance with aspects of the invention. FIG. 5 shows four products 410a, 410b, 410c, 410d, each of which represent a respective product 410 in the private network 405 of FIG. 4. As shown in FIG. 5, each product 410a-d has a unique ID. Also show in FIG. 5 is a portion of the data stored in the remote support database 440, each row of the data including an ID and a command.

In this example, when product 410a connects to the remote support database 440, the remote support module 445 determines that the ID of product 410a is included in a row of the data in the remote support database 440. As a result, the support provider computing device 435 responds to product 410a with a communication that includes the command that is in the row with the ID of product 410a (e.g., command-a in this example). Continuing this example, product 410a receives the response that contains the command and then sends a request to the administrator computing device 425 to execute the command. In the event that the administrator computing device 425 approves the request to execute the command, then the product 410a executes the command and sends result data to the support provider computing device 435. In the event that the administrator computing device 425 denies the request to execute the command, then the product 410a does not execute the command, and the administrator computing device 425 sends a negative feedback response to the support provider computing device 435.

In the example of FIG. 5, when product 410d connects to the remote support database 440, the remote support module 445 determines that the ID of product 410d is not included in any row of the data in the remote support database 440. As a result, the support provider computing device 435 responds to product 410d with an indication that there is no command for product 410d. Based on receiving this response indicating no command, product 410d then disconnects from the remote support database 440.

Figure 6:
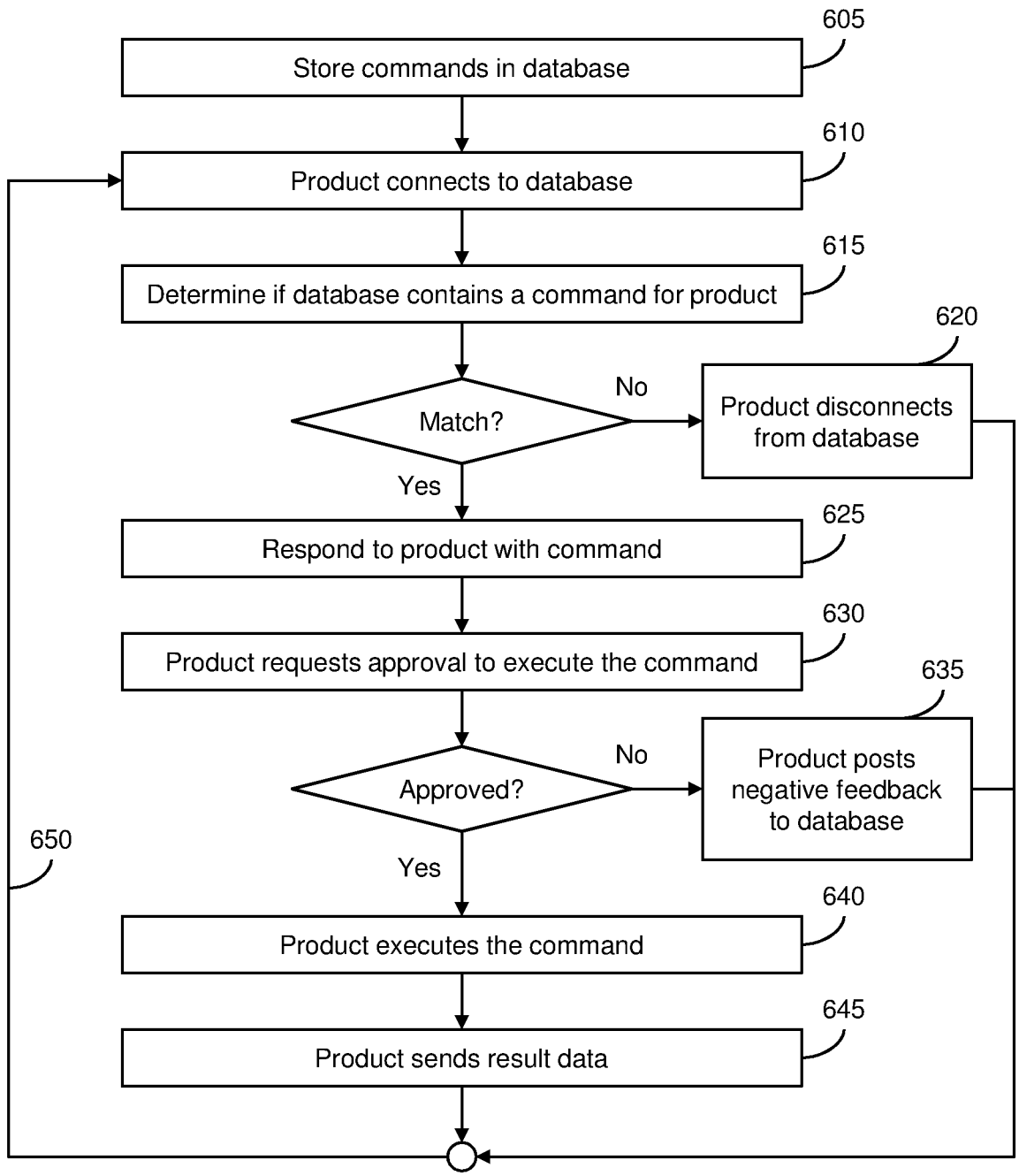
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4.

At step 605, the system stores commands in a support database. In embodiments, and as described with respect to FIG. 4, a support provider (e.g., a support engineer) uses the support provider computing device 435 to store commands in the remote support database 440. In embodiments, each command is stored with information that includes a unique identifier of one of plural products. In embodiments, the support provider may store commands for plural different products for plural different customers in the same remote support database 440.

At step 610, a product connects to the database for the purpose of retrieving any stored commands that are intended for this particular product. In embodiments, and as described with respect to FIG. 4, a particular one of the products 410 connects to the remote support database 440 using an outbound connection. In embodiments, the product 410 includes its unique identifier in the communication to the remote support database 440.

At step 615, the system determines whether the database contains any commands for the product that connected to the database at step 610. In embodiments, and as described with respect to FIG. 4, the remote support module 445 compares the unique identifier received from the product 410 (at step 610) to the unique identifiers stored with the commands in the remote support database 440. In the event there is no match between the unique identifier received from the product 410 and the unique identifiers stored with the commands, then at step 620 the support provider computing device 435 responds to the product 410 with an indication of no commands, and the product 410 disconnects from the remote support database 440. In the event there is a match between the unique identifier received from the product 410 and at least one of the unique identifiers stored with the commands, then at step 625 the support provider computing device 435 responds to the product 410 with a communication that includes the command for this product 410.

At step 630, the product requests approval to execute the command that it received at step 625. In embodiments, and as described with respect to FIG. 4, the product 410 requests approval to execute the command from the administrator computing device 425. In some embodiments, the administrator computing device 425 automatically determines whether to approve or deny the request based on lists of pre-approved commands. In some embodiments, the administrator computing device 425 determines whether to approve or deny the request based on user input. In the event the administrator computing device 425 denies the request to execute the command, then at step 635 the product 410 does not execute the command and the product 410 sends a negative feedback message to the support provider computing device 435. In embodiments, the negative feedback message includes information that the command was not executed. The negative feedback message may include other information such as a reason that the command was not approved.

In the event the administrator computing device 425 approves the request to execute the command, then at step 640 the product executes the command. In embodiments, and as described with respect to FIG. 4, the product 410 executes the command. At step 645, the product sends result data to support provider computing device 435. In embodiments, and as described with respect to FIG. 4, the product 410 sends its unique identifier and result data that results from executing the command to the support provider computing device 435, and the support provider computing device 435 saves this result data in a log with the unique identifier. As indicated by arrow 650, the product 410 waits a predefined amount of time after each of steps 620, 635, and 645 before connecting to the database again at step 610.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   connecting, by a computing device, to a database using an outbound connection, wherein the computing device is an information technology (IT) product in a private network and the database is outside the private network, and wherein the IT product is registered with the database with a unique identifier of the IT product;
   receiving, by the computing device, a response from the database based on the unique identifier of the IT product, the response including a command for execution by the IT product;
   executing, by the computing device, the command on the IT product; and
   sending, by the computing device, result data to the database, wherein the result data is data that results from executing the command on the computing device.

2. The method of claim 1, wherein the private network includes a firewall that blocks inbound connections from devices outside the private network.

3. The method of claim 2, wherein the response from the database is a response to the outbound connection.

4. The method of claim 1, wherein the connecting includes the computing device transmitting its unique identifier to the database.

5. The method of claim 4, wherein the command is one of many commands stored in the database, the command being stored with information that matches the unique identifier.

6. The method of claim 4, wherein the executing the command causes the computing device to perform one of:

change system log level; change system parameters; upgrade system code; capture system logs and upload to server; and run a script.

7. The method of claim 4, wherein the sending the result data includes sending the unique identifier.

8. The method of claim 7, wherein the result data includes one or more selected from the group consisting of: error codes; status codes; diagnostic data; settings and configuration data; system logs; and application logs.

9. The method of claim 1, further comprising:
requesting approval to execute the command;
receiving the approval based on comparison of the command to a pre-approved list of commands; and
performing the executing the command after receiving the approval to execute the command.

10. The method of claim 9, wherein the requesting approval to execute the command comprises the computing device requesting approval from an administrator computing device in the private network.

11. The method of claim 1, further comprising:
waiting a predefined amount of time and then connecting again to the database; and receiving another response based on the connecting again to the database.

12. The method of claim 11, further comprising disconnecting from the database based on the other response not including another command.

13. The method of claim 11, wherein the other response includes another command, and further comprising:
requesting approval to execute the other command;
receiving a denial in response to the requesting approval to execute the other command; and
posting negative feedback to the database in response to the receiving the denial.

14. A computer program product comprising one or more computer readable storage media having program instructions collectively stored on the one or more computer readable storage media, the program instructions executable to cause a computing device to:
connect to a database using an outbound connection as a result of a problem trigger that requires support from a support provider, wherein the computing device is an information technology (IT) product in a private network and the database is outside the private network, and wherein the IT product is registered with the database with a unique identifier of the IT product;
receive a response from the database based on the unique identifier of the IT product, the response including a command for execution by the IT product;
execute the command on the IT product; and
send result data to the database, wherein the result data is data that results from executing the command on the computing device,
wherein the private network includes a firewall that blocks inbound connections from devices outside the private network;

the response from the database is a response to the outbound connection; and
the connecting includes the computing device transmitting its unique identifier to the database.

15. The computer program product of claim 14, wherein the command is one of many commands stored in the database, the command being stored with information that matches the unique identifier.

16. The computer program product of claim 14, wherein the sending the result data includes sending the unique identifier.

17. The computer program product of claim 14, wherein the program instructions cause the computing device to:
request approval to execute the command;
receive the approval based on comparison of the command to a pre-approved list of commands; and
perform the executing the command after receiving the approval to execute the command.

18. The computer program product of claim 14, wherein the program instructions cause the computing device to:
wait a predefined amount of time and then connecting again to the database; and
receive another response based on the connecting again to the database.

19. A system comprising:
a processor, a computer readable memory, one or more computer readable storage media, and program instructions collectively stored on the one or more computer readable storage media, the program instructions executable to cause a support provider computing device to:
store plural commands in a database, each respective one of the commands being associated with a respective unique identifier of an information technology (IT) product registered with the database;
receive an outbound connection from the IT product that is behind a firewall in a private network, the outbound connection including an identifier of the IT product;
identify one of the commands stored in the database by matching the received identifier of the IT product to the respective unique identifier stored in the database;
respond to the outbound connection from the IT product with a response communication that includes the identified one of the commands;
receive result data from the IT product as a result of the IT product executing the identified one of the commands; and
store the result data with the respective unique identifier of the IT product in the database.

20. The system of claim 19, wherein:
the firewall blocks inbound connections from devices outside the private network; and
the support provider computing device is outside the private network.

\* \* \* \* \*